May 23, 1933. E. S. GRAFENSTATT ET AL 1,911,019
MACHINE FOR MOLDING BRIQUETTES AND THE LIKE
Filed May 27, 1931
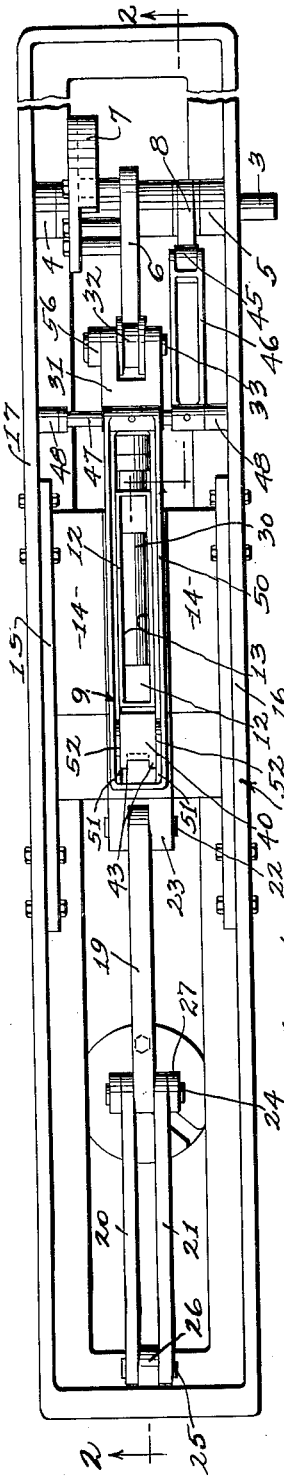
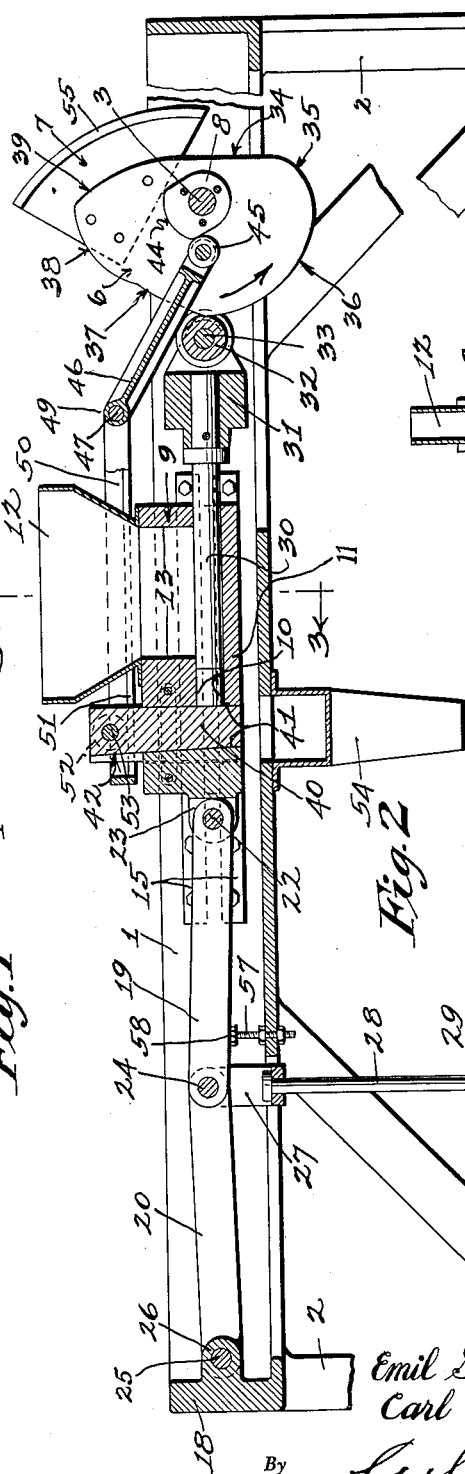
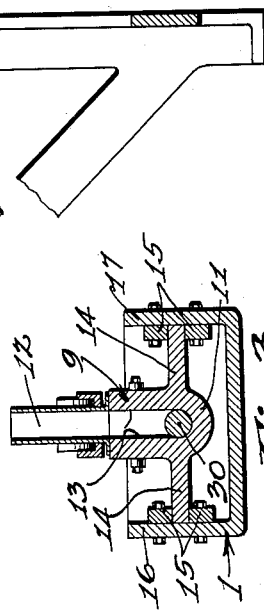
Inventors,
Emil S. Grafenstatt,
Carl F. Westberg.
By
Arthur L. Mack
Attorney.

Patented May 23, 1933

1,911,019

UNITED STATES PATENT OFFICE

EMIL S. GRAFENSTATT AND CARL F. WESTBERG, OF LOS ANGELES, CALIFORNIA

MACHINE FOR MOLDING BRIQUETTES AND THE LIKE

Application filed May 27, 1931. Serial No. 540,398.

This invention relates to and has for an object the provision of an improved mechanism for molding comminuted material into cakes, tablets, or briquettes, as for instance, when coal dust is used in the production of briquettes.

An object is to provide in a machine of the character mentioned a mold and a power operated plunger associated therewith, together with adjustable means for movably supporting the mold relative to the plunger so that when a predetermined pressure is applied to the molded material the mold will be automatically retracted relative to the plunger for preventing the further compression of the material.

A further object is to provide a cavity pressure regulating device associated with the mold and supported on a toggle mechanism whereby a maximum pressure in the mold may be created when the toggle is near dead center and the pressure created in the mold reduced as the toggle is moved away from dead center position.

Other objects include the provision of a suitable means for feeding the material to the mold cavity, means for reciprocating the plunger, and means for ejecting the molded briquettes at the completion of each molding operation.

Still other objects may appear as the description progresses.

In the accompanying drawing we have shown a preferred form of invention in which Fig. 1 is a top plan view of an assembled molding machine.

Fig. 2 is a sectional elevation of the same on line 2—2 of Fig. 1.

Fig. 3 is a transverse section thru the mold on line 3—3 of Fig. 2.

As generally arranged, the mechanism is mounted on a suitable frame including a bed 1, having legs 2, 2 etc. depending therefrom. A power operated shaft 3 is journaled in bearings 4 and 5 on opposite sides of the bed 1 and is transversely disposed on said bed. Said shaft is provided with cams 6, 7 and 8 which are fixed to the shaft as shown in Figs. 1 and 2 and are operatively associated with the molding mechanism as hereinafter explained.

Forwardly of the shaft 3 we provide a mold 9 having a circular cavity 10 formed in the bottom 11 thereof. Attached to the body of the mold we provide a hopper 12 for receiving the material to be molded, and said hopper communicates with a vertical passage 13 formed in the body of the mold and thence with the cavity 10.

The mold 9 is longitudinally movable on the bed 1, and to this end ribs 14, 14 extend outwardly from the body of the mold and are slidably held between pairs of guides 15, 15 attached to the opposite sides 16 and 17 of the bed, as shown in Fig. 3. The mold 9 is connected with an end 18 of the bed by means of toggle links 19, 20 and 21, the link 19 being pivotally connected at 22 to a lug 23 on an end of mold 9 and also pivotally connected at 24 to the inner ends of the similar links 20 and 21. Said last mentioned links are pivotally connected at 25 to a lug 26 extending inwardly from the end 18 of the bed. The pin 24, which constitutes the hinge of links 19, 20 and 21, carries a yoke 27 which depends from the links and has a rod 28 secured thereto and depending therefrom which serves as a support for one or more weights, as at 29. The purpose of the weights 29 in connection with the toggle mechanism is to hold the mold 9 in normally operative position at its rearward extreme of movement, but permits the forward movement of the mold when a predetermined pressure is created in the mold, as more fully explained hereinafter.

The mold 9 slidably supports in its bottom a plunger 30 which operates at the bottom of the passage 13 and in and out of the cavity 10, said plunger being axially alined with said cavity. The extended end of the plunger 30 carries a head 31 with a follower roller 32 thereon which is rotatably held on a pin 33 for engagement with the periphery of the main cam 6. Thus as the shaft 3 is rotated in a counter-clockwise direction, as seen in Fig. 2, the plunger 30 will be entirely retracted from the mold cavity 10 when the roller 32 engages the portion 34 of cam 6.

The continued rotation of shaft 3, however, will cause the roller 32 to engage a rise 35 and an eccentric dwell 36 on said cam for forcing the plunger 30 inwardly to its extreme inward position against the molded material for a predetermined pressure. Thereafter the roller 32 will traverse successive portions 37, 38 and 39 of the cam 6 in the completion of a cycle of operation.

Incidentally, however, it will be noted that the mold cavity 10 is closed by means of a wedge 40 which is slidable in a vertical recess 41 of the mold. The rear side 42 of said wedge and the corresponding side of the mold opening 41 are tapered, as shown in Fig. 2, so that when the wedge is in its lowermost position it will be caused to tightly engage the walls of the opening 41 for completely closing the mold cavity 10. Said wedge is retractible upwardly from cavity closing position and is provided with ribs or shrouds 43 which are guided in ways formed in the mold body, and said ways are parallel with the opposite side of the opening 41 so that the wedge when it is retracted will be moved in a true vertical path.

Thus when the plunger 30 is forced inwardly by cam 6 against the material to be molded the material is molded between the wedge 40 and the inner end of plunger 30.

Following the traverse of roller 32 over the dwell 36 of cam 6, during which the material is compressed and molded into proper form, the pressure on the molded material is relieved by the ensuing traverse of the portion 37 by roller 32. Immediately following the slight retraction of plunger 30 or the relief of the pressure in the mold cavity, the cam 8 becomes effective for retracting the wedge 40 from mold closing position. Said cam 8 has a dwell 44 thereon which engages a roller 45 carried on an arm 46 which is fixed to a transverse rock shaft 47 supported in bearings 48, 48 on the sides of the bed 1.

A yoke 50 is fixed to the rock shaft 47 and is provided with an opening which embraces the hopper 12 and the wedge 40. Said yoke is provided with oppositely formed tracks 51, 51 and the upper end of wedge 40 is provided with a pair of rollers 52, 52 which roll on said tracks and are supported on a pin 53 in the wedge.

Thus as cam 8 depresses the arm 46 the shaft 47 will be rocked in a clockwise direction and the yoke 50 will be elevated and will thus effect the raising of wedge 40 to mold opening position. When the wedge has been thus opened the roller 32 will then traverse a rise 38 on cam 6 and plunger 30 will be moved further forwardly so as to eject the molded briquette from the mold cavity into the opening 41 which has been previously vacated by the elevation of the wedge 40.

As the briquettes are discharged from the mold cavity they may be delivered from opening 41 into a suitable shoot or trough 54 thru which they may be conveyed to a suitable receiving receptacle.

The cam 7 is a segment suitably attached to shaft 3 or cam 6 and has an eccentric rim 55 thereon which is disposed in the path of a follower roller 56 coaxially mounted on the pin 33 with the roller 32. Thus during the further rotation of shaft 3 at the completion of an ejecting operation the cam rim 55 will engage the follower roller 56 for retracting the plunger 30 to a position in engagement with the lowest point on the cam 6 preparatory to a succeeding operation.

The weights 29 may be of such number and weight that they will hold the mold 9 retracted in normal position during a molding operation, but when an excessive pressure is created therein the toggle composed of links 19, 20 and 21 will break and said links will be swung upwardly with the weights 29, thereby moving the mold forwardly to a corresponding extent. The downward movement of the links 19, 20 and 21 is limited by means of an adjusting screw 57 carried on the bed 1 and provided with a cap or nut 58 adapted to engage the lower edge of link 19, or, any other suitable adjusting device may be employed in lieu thereof.

In operation, material is fed to the hopper 12 which fills the bottom compartment 13 of the hopper immediately above the plunger 30. When the shaft 3 is rotated the plunger 30 is retracted so that the inner end thereof is substantially spaced from the mold cavity 10, allowing material to fill the space previously occupied by the plunger adjacent the cavity. The succeeding forward stroke of the plunger effected by the cam 6 forces the material into the cavity and compresses it to a predetermined extent, after which pressure on the plunger is relieved and the cam 8 becomes operative for elevating the wedge 40 to a point above the mold cavity, whereupon the cam 6 becomes operative for ejecting the molded material from the cavity and discharging the same into the shoot 54 for further distribution.

The operation continues in successive cycles as described so long as the shaft 3 is rotated and material is fed to the hopper 12.

What we claim is:

1. A molding machine of the character described comprising a frame, a mold movable on the frame and provided with a cavity for receiving material to be molded, a power operated plunger reciprocable in the mold for compressing material in said cavity, and means normally opposing the movement of the mold on the frame when power is applied to the plunger, said means being automatically operative to permit a movement of the mold in a direction corresponding to the movement of the plunger when more than a predetermined pressure is applied to the molded material.

2. A molding machine as characterized in claim 1, including a mold closing member movable to and from closing position adjacent said cavity, and means for automatically moving said member to open the mold at the completion of a molding operation and to close the mold preparatory to a succeeding molding operation.

3. A molding machine as characterized in claim 1, including a mold closing member movable to and from closing position adjacent said cavity, means for automatically moving said member to open the mold at the completion of a molding operation and to close the mold preparatory to a succeeding molding operation, and means for relieving the pressure in the mold and against said plunger preparatory to a mold opening operation.

4. A molding machine as characterized in claim 1, including a mold closing member movable to and from closing position adjacent said cavity, means for automatically moving said member to open the mold at the completion of a molding operation and to close the mold preparatory to a succeeding molding operation, means for relieving the pressure in the mold and against said plunger preparatory to a mold opening operation, and means for effecting an overstroke of said plunger following a mold opening operation for ejecting the molded material from the mold.

5. A molding machine as characterized in claim 1, including a mold closing member movable to and from closing position adjacent said cavity, means for automatically moving said member to open the mold at the completion of a molding operation and to close the mold preparatory to a succeeding molding operation, means for relieving the pressure in the mold and against said plunger preparatory to a mold opening operation, means for effecting an over-stroke of said plunger following a mold opening operation for ejecting the molded material from the mold, and means for automatically retracting said plunger following an ejecting operation sufficiently to effect a refilling of the mold cavity preparatory to a succeeding molding operation.

6. A molding machanism of the character described comprising a frame, a mold yieldably mounted thereon and provided with a recess for holding a quantity of material to be molded, a plunger slidable in the mold adjacent said recess, a cavity formed in said mold in alinement with said plunger, a mold closing member movable adjacent and at right angles to said cavity to open and close the same, power operated means for successively advancing said plunger into the cavity of the mold to fill and compress the molded material therein, slightly retract the plunger to relieve the pressure in the cavity, operate said mold closing member for opening the cavity, and thereafter to further advance said plunger to eject the molded material and retract the plunger to a position for an ensuing operation.

7. A molding machine of the character described comprising a frame, a mold yieldably mounted thereon having a recess for receiving the quantity of material to be molded, a cavity adjacent said recess, and a plunger slidable in the mold adjacent the recess and alined with said cavity, a power operated shaft, a cam on said shaft having peripheral portions adapted to successively advance the plunger on a compression stroke, retract the same for relieving the pressure in the mold, advance the plunger in an over-stroke for ejecting the molded material, and finally to retract the plunger to a position for a succeeding operation, and gravity operated means normally opposing the movement of the mold and operative to permit the movement thereof when more than normal pressure is applied thereto.

8. A molding machine as characterized in claim 7, including a mold closing member slidably mounted in the mold adjacent the mold cavity, a second cam on said shaft, and means controlled by said cam for moving said mold closing member to open said cavity prior to the over-stroke of said plunger to permit the ejection of the molded material, and further movable for closing the cavity at the completion of an ejection operation.

9. A molding mechanism comprising a frame, a mold movably mounted thereon, a power operated plunger reciprocable in the mold for compressing and molding the material therein, and gravity operated means yieldably connecting the mold with said frame, for preventing the movement of the mold on the frame during a molding operation when less than a predetermined pressure is created in the mold, but permitting the movement of the mold when an excessive pressure is created therein.

10. A molding mechanism comprising a frame, a mold movably mounted thereon, a power operated plunger reciprocable in the mold for compressing and molding the material therein, and cavity operated means yieldably connecting the mold with said frame, for preventing the movement of the mold on the frame during a molding operation when less than a predetermined pressure is created in the mold, but permitting the movement of the mold when an excessive pressure is created therein, said last mentioned means including means for varying the adjustment of the gravity operated means to correspond to the effective pressures in the mold at which said means shall be operated.

11. A molding device of the character described comprising a frame, a mold movably mounted on the frame, toggle devices connecting the mold and the frame, a power operated plunger reciprocable in the mold for compressing materials therein, and means associated with said toggle devices opposing the movement of said mold on said frame when pressure is applied to the mold by said plunger, said toggles being yieldable to permit the movement of the mold on the frame when more than a predetermined pressure is created in the mold.

12. A molding device of the character described in claim 11, including means for adjusting said toggle devices to correspond to various effective pressures in the mold.

13. A molding device comprising a frame, a mold slidable on the frame, means for applying pressure in the mold in a molding operation, means for yieldably connecting the mold with said frame and normally opposing the movement of the mold on the frame, said last mentioned means being tensioned to permit the movement of the mold on the frame when a predetermined pressure is created in the mold.

14. A molding machine of the character described comprising a frame, a mold longitudinally slidable thereon, a plunger longitudinally movable in the mold, power operated means for actuating said plunger, yieldable toggle devices connecting said mold with said frame, and a weight associated with said toggle devices and tending to hold the toggle devices at or near dead center position when a normal pressure is applied to the mold, said toggles being yieldable from near dead center position when an excessive pressure is created in the mold.

15. A molding machine as characterized in claim 14, including means for adjusting said toggle devices to render said toggles operative to correspond to different pressures in the mold.

EMIL S. GRAFENSTATT.
CARL F. WESTBERG.